United States Patent
Han et al.

(10) Patent No.: US 10,813,071 B2
(45) Date of Patent: Oct. 20, 2020

(54) EVOLVED NODE-B AND USER EQUIPMENT AND METHODS FOR OPERATION IN A COVERAGE ENHANCEMENT MODE

(71) Applicant: Apple Inc., Cupertino, CA (US)

(72) Inventors: Seunghee Han, San Jose, CA (US); Gang Xiong, Beaverton, OR (US); Alexei Davydov, Nizhny Novgorod (RU); Jong-Kae Fwu, Sunnyvale, CA (US); Gi Wan Choi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/538,823

(22) Filed: Aug. 13, 2019

(65) Prior Publication Data

US 2020/0037278 A1 Jan. 30, 2020

Related U.S. Application Data

(63) Continuation of application No. 15/701,090, filed on Sep. 11, 2017, now Pat. No. 10,420,053, which is a
(Continued)

(51) Int. Cl.
*H04W 56/00* (2009.01)
*H04L 5/00* (2006.01)

(52) U.S. Cl.
CPC ....... *H04W 56/0045* (2013.01); *H04L 5/0053* (2013.01); *H04W 56/0015* (2013.01); *H04L 5/0007* (2013.01)

(58) Field of Classification Search
CPC .......... H04W 56/0045; H04W 56/0015; H04L 5/0053; H04L 5/0007
(Continued)

(56) References Cited

U.S. PATENT DOCUMENTS 9,763,210 B2 * 9/2017 Han ................ H04W 56/0015
10,420,053 B2 * 9/2019 Han ................ H04W 56/0045
(Continued)

FOREIGN PATENT DOCUMENTS

CN 101998418 A * 3/2011
CN 102111208 A * 6/2011 ........... H04B 7/2603
(Continued)

OTHER PUBLICATIONS

"Evolved Universal Terrestrial Radio Access (E-UTRA); Multiplexing and channel coding", 3GPP TS 36.212 version 8.8.0 Release 8 LTE, (Jan. 2010), 62 pgs.*
(Continued)

*Primary Examiner* — Afsar M Qureshi
(74) *Attorney, Agent, or Firm* — Kowert, Hood, Munyon, Rankin & Goetzel, P.C.

(57) ABSTRACT

Embodiments of an eNB to operate in accordance with a coverage enhancement mode are disclosed herein. The eNB may comprise hardware processing circuitry to, during a legacy sub-frame, transmit a system information block (SIB) in legacy SIB frequency resources according to a legacy SIB transmission format and refrain from transmission of channel state information reference signals (CSI-RS). The hardware processing circuitry may be further to, during a first coverage enhancement sub-frame, transmit a first portion of the SIB in first SIB frequency resources included in the legacy SIB frequency resources. The hardware processing circuitry may be further to, during a first coverage enhancement sub-frame, transmit a first set of CSI-RS in first CSI-RS frequency resources that include at least a portion of the legacy SIB frequency resources.

20 Claims, 9 Drawing Sheets

Related U.S. Application Data continuation of application No. 14/481,396, filed on Sep. 9, 2014, now Pat. No. 9,763,201.

(60) Provisional application No. 61/933,853, filed on Jan. 30, 2014, provisional application No. 61/933,848, filed on Jan. 30, 2014, provisional application No. 61/933,867, filed on Jan. 30, 2014.

(58) Field of Classification Search
USPC .................................................. 370/328, 329
See application file for complete search history.

(56) References Cited

U.S. PATENT DOCUMENTS

| | | | | |
|---|---|---|---|---|
| 2012/0058791 A1* | 3/2012 | Bhattad | ................ | H04L 27/261 455/509 |
| 2013/0121276 A1* | 5/2013 | Kim | ..................... | H04L 5/0053 370/329 |
| 2013/0137469 A1* | 5/2013 | Schmidt | ............. | H04W 74/006 455/466 |
| 2014/0140277 A1 | 5/2014 | Barrett | | |
| 2015/0029903 A1* | 1/2015 | Chen | ................ | H04W 72/0446 370/277 |
| 2015/0131568 A1* | 5/2015 | You | ....................... | H04W 88/02 370/329 |
| 2015/0215910 A1 | 7/2015 | Han et al. | | |
| 2016/0128011 A1* | 5/2016 | Yang | ....................... | H04W 4/70 370/329 |
| 2016/0198024 A1* | 7/2016 | Yu | ......................... | H04W 76/27 370/312 |
| 2018/0027516 A1 | 1/2018 | Han et al. | | |

FOREIGN PATENT DOCUMENTS

| | | | | |
|---|---|---|---|---|
| CN | 102387559 A | * | 3/2012 | ........ H04W 36/0055 |
| JP | 6162330 B2 | * | 7/2017 | ........ H04W 36/0055 |
| WO | WO-2013108048 A1 | * | 7/2013 | ........... H04L 5/0005 |

OTHER PUBLICATIONS

"U.S. Appl. No. 14/481,396, Notice of Allowance dated May 9, 2017", 11 pgs.

"U.S. Appl. No. 14/481,396, Response filed Jan. 17, 2017 to Restriction Requirement dated Nov. 14, 2016", 10 pgs.

"U.S. Appl. No. 14/481,396, Restriction Requirement dated Nov. 14, 2016", 7 pgs.

"U.S. Appl. No. 15/701,090, Notice of Allowance dated May 2, 2019", 10 pgs.

\* cited by examiner

EVOLVED NODE-B AND USER EQUIPMENT AND METHODS FOR OPERATION IN A COVERAGE ENHANCEMENT MODE

PRIORITY CLAIM

This application is a continuation of U.S. patent application Ser. No. 15/701,090, filed Sep. 11, 2017, now U.S. Pat. No. 10,420,053 B2, issued on Sep. 17, 2019 which is a continuation of U.S. patent application Ser. No. 14/481,396, filed Sep. 9, 2014, which claims priority under 35 USC 119(e) to U.S. Provisional Patent Application Ser. No. 61/933,853 filed Jan. 30, 2014, U.S. Provisional Patent Application Ser. No. 61/933,848 filed Jan. 30, 2014, and United 15 States Provisional Patent Application Ser. No. 61/933,867 filed Jan. 30, 2014, all of which are incorporated herein by reference in their entirety.

TECHNICAL FIELD

Embodiments pertain to wireless communications. Some embodiments relate to cellular communication networks including LTE networks. Some embodiments relate to enhanced coverage communication. Some embodiments relate to broadcast control messages including SIBs. Some embodiments relate to downlink control or traffic channels including PDCCH and PDSCH channels. Some embodiments relate to Machine Type Communication (MTC).

BACKGROUND

A mobile device operating in a cellular network may sometimes experience a reduction in link quality, which may occur for any number of reasons. For instance, the device may move beyond the edge of coverage or a large obstacle may appear in the environment. Such a sudden reduction in link quality may result in poor or unacceptable performance at the device.

A hand-off of the device to a different cell or sector of the network may sometimes be impossible or at least challenging, such as in the previous example. In some cases, the mobile device may need to continue communicating in the current cell, perhaps even when a signal level or quality of the link is below a link budget threshold. Accordingly, there is a need for methods that enable the device to communicate in conditions or environments with reduced link quality.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
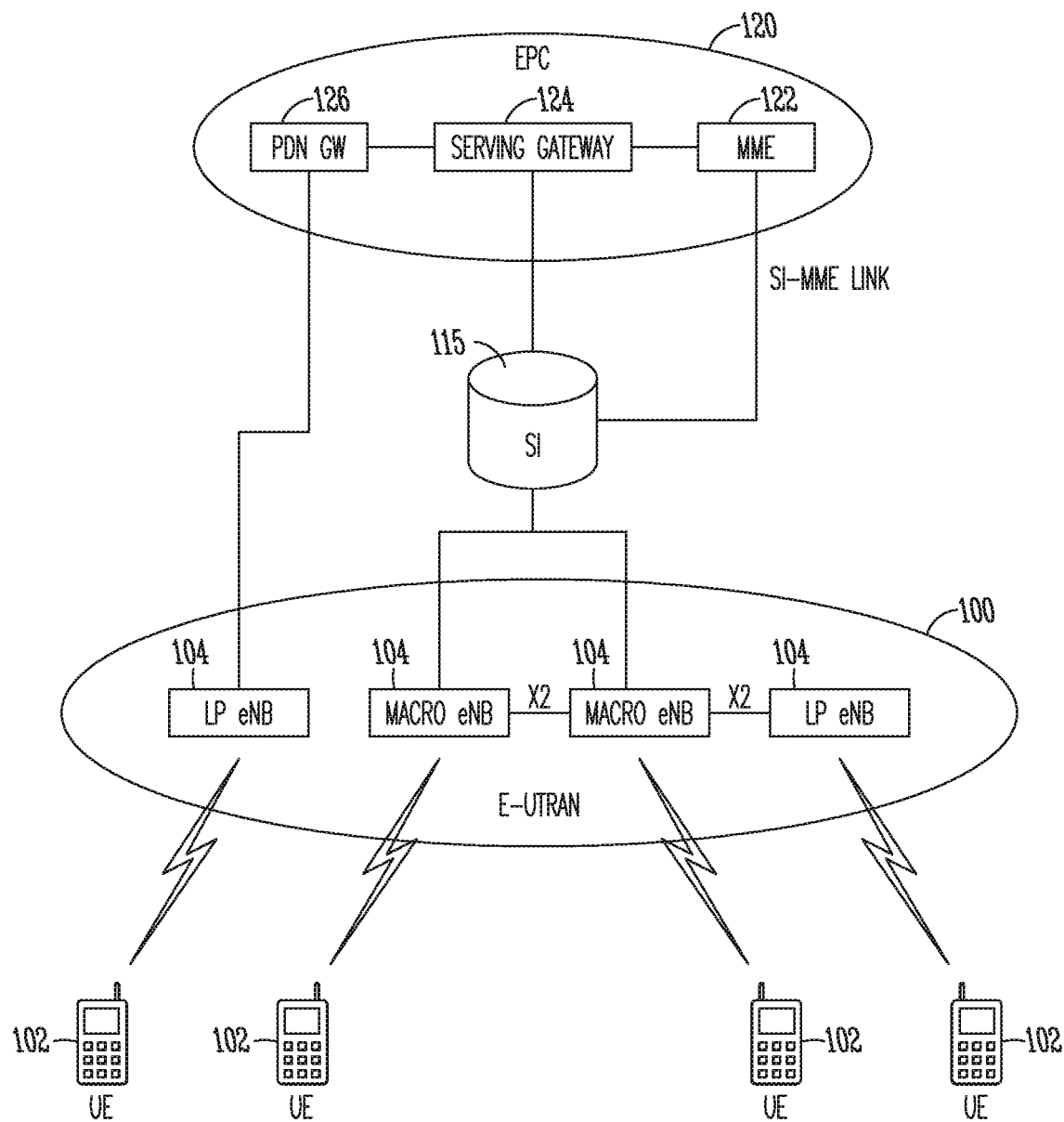
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement.

The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
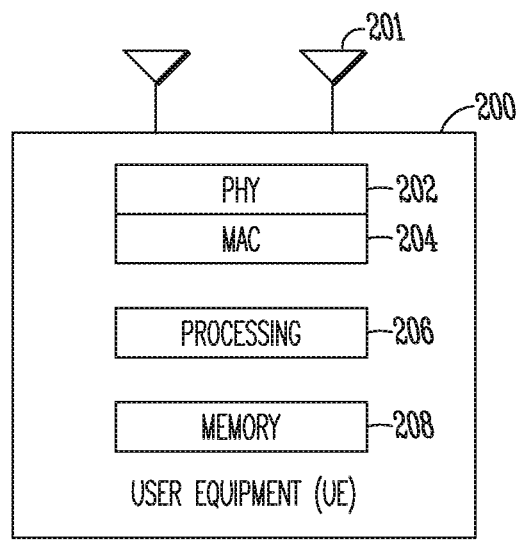
FIG. 2 is a functional diagram of a User Equipment (UE) in accordance with some embodiments.
Figure 3:
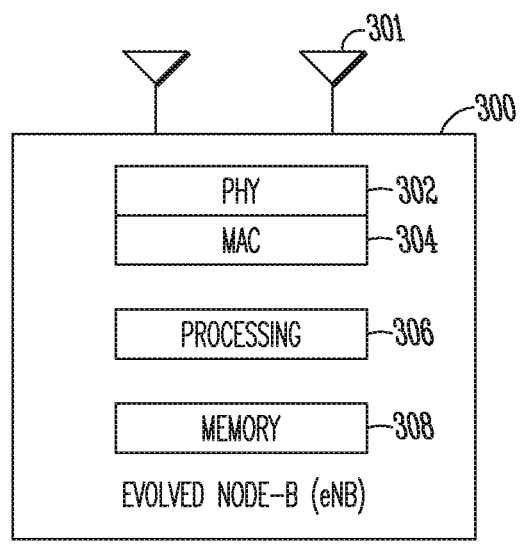
FIG. 3 is a functional diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

In some embodiments, the UE 200 may be designed as or may operate as a Machine Type Communication (MTC) device, or may support MTC. MTC may include communication between devices that involves little or no human intervention or input. For instance, communication between sensors in a home or other environment may employ MTC. In some cases, MTC devices may be low-complexity or low-cost, but are not limited as such. For instance, an MTC device may have limited memory or processing power, which may result from a design effort to make the device low-cost. In addition, the UE 102 or other device may support both MTC and non-MTC communication in some cases, either simultaneously or separately.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the eNB 104 may operate in accordance with a coverage enhancement mode. The eNB 104 may comprise hardware processing circuitry to, during a legacy sub-frame, transmit a system information block (SIB) in legacy SIB frequency resources according to a legacy SIB transmission format and refrain from transmission of channel state information reference signals (CSI-RS). The hardware processing circuitry may be to further, during a first coverage enhancement sub-frame, transmit a first portion of the SIB in first SIB frequency resources included in the legacy SIB frequency resources and transmit a first set of CSI-RS in first CSI-RS frequency resources that include at least a portion of the legacy SIB frequency resources. These embodiments are described in more detail below.

In some cases, the UE 102 (or any mobile device) operating in a cellular communication network may begin to experience performance degradation, particularly as it moves toward the edges of coverage cells. Typically, the UE 102 may engage in hand-off to another cell or sector of the network, a process which may begin long before the UE 102 actually reaches the edge of its serving cell. In some cases, however, the UE 102 may not be able to perform, or simply may not perform, a hand-off, and may need to remain in communication with the current cell, such as a cell served by the eNB 104. In such cases, downlink reception at the UE 102 may benefit from additional diversity techniques. As an example, the UE 102 may operate in a coverage enhancement mode, which will be described below.

Figure 4:
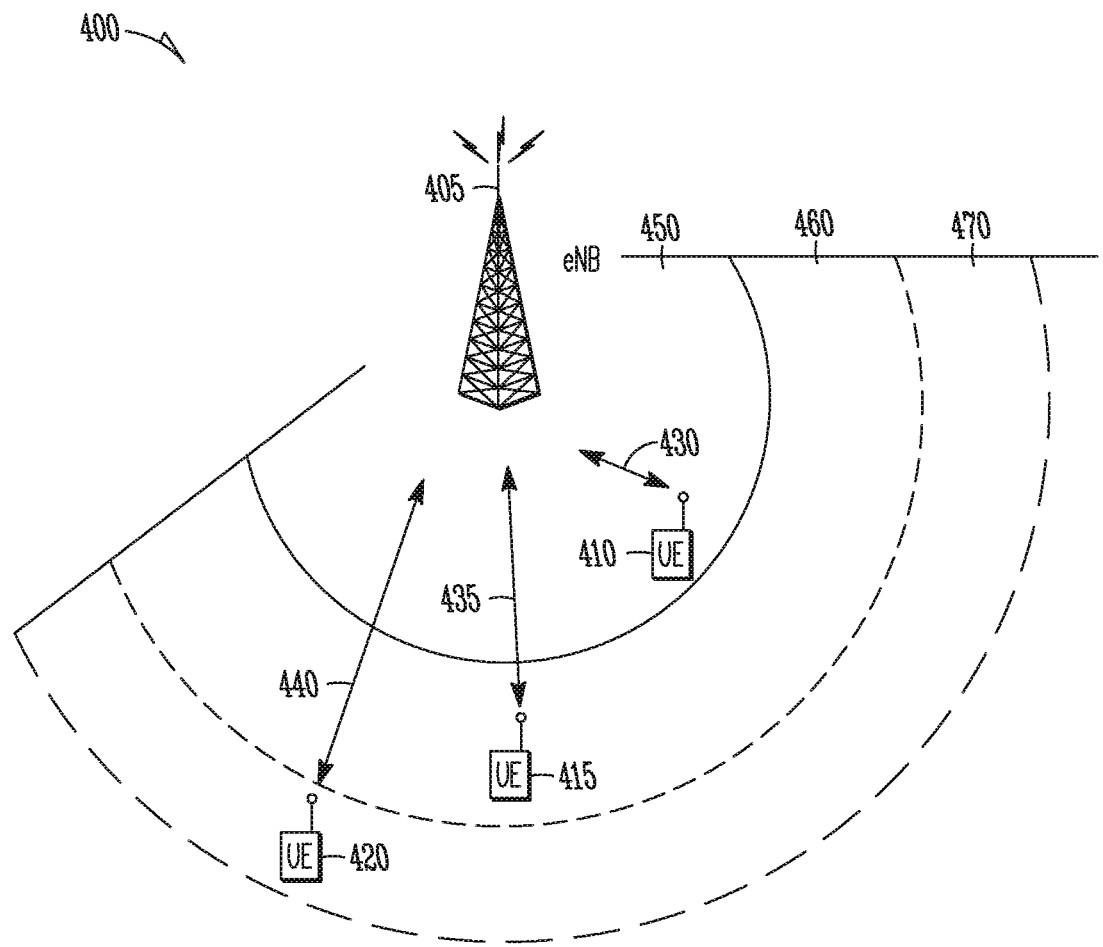
FIG. 4 is an example of a scenario that may utilize coverage enhancement in accordance with some embodiments.

Referring to FIG. 4, an example of a scenario 400 is shown, in which coverage enhancement techniques may be necessary or beneficial. In the scenario 400, a tower eNB 405 (which can be the eNB 104) and three UEs 410, 415, 420 (which can be the UE 102) located at various distances from the eNB 405 are operating, or attempting to operate, as part of an LTE network. It should be noted that the eNB 405 is not limited to the tower configuration and that scenarios described herein are not limited to the number or distribution of eNBs 405 or UEs 410, 415, 420 as shown in FIG. 4. The first UE 410 is in communication with the eNB 405 over the link 430, and is comfortably located within the coverage area 450 of the eNB 405. The second UE 415 is located outside of the coverage area 450 in a demarcated zone 460, and may be experiencing challenging downlink reception over the link 435. Similarly, the third UE 420 is also located outside of the coverage area 450 in another demarcated zone 470 that is further away from the eNB 405 than the first demarcated zone 460. The third UE 420 may also be experiencing challenging downlink over the link 440.

The second UE 415 and third UE 420 may be described as needing "coverage enhancement," or operating in "coverage enhancement mode," as they are out of the coverage area 450. Additionally, while both UEs 415, 420 are outside of the coverage area 450, the third UE 420 may have more trouble or challenges in downlink reception than the second UE 415, as the third UE 420 is further away from the eNB 405. Accordingly, it may be possible to formulate different categories of coverage enhancement for UEs depending on how far out of coverage they are located or other factors. In some embodiments, descriptions may be used in the categories. For instance, the third UE 420 may be considered in a "high" category while the second UE 415 may be considered in a "low" category. In some embodiments, the categories may be numerical, such as 5 dB, 10 dB, and 15 dB, which may represent an additional amount of link budget that would have to be added to the UEs 415, 420 in order to realize a "normal operation." The normal operation may be characterized by any suitable criteria such as a target packet error rate, acquisition time, data throughput or the like.

It should be pointed out that the above discussion focuses on path loss due to distance only, for purposes of illustration, but this is not limiting. It is known in the art that path loss, signal loss, coverage holes or the like may result from effects other than distance, such as obstacles or indoor location. For instance, a device located in a basement of a building close to the eNB 405 may actually be in need of a coverage enhancement while another device located much further away, but outdoors, may have a stronger connection to the eNB 405 and may be in need of less or no coverage enhancement.

Figure 5:
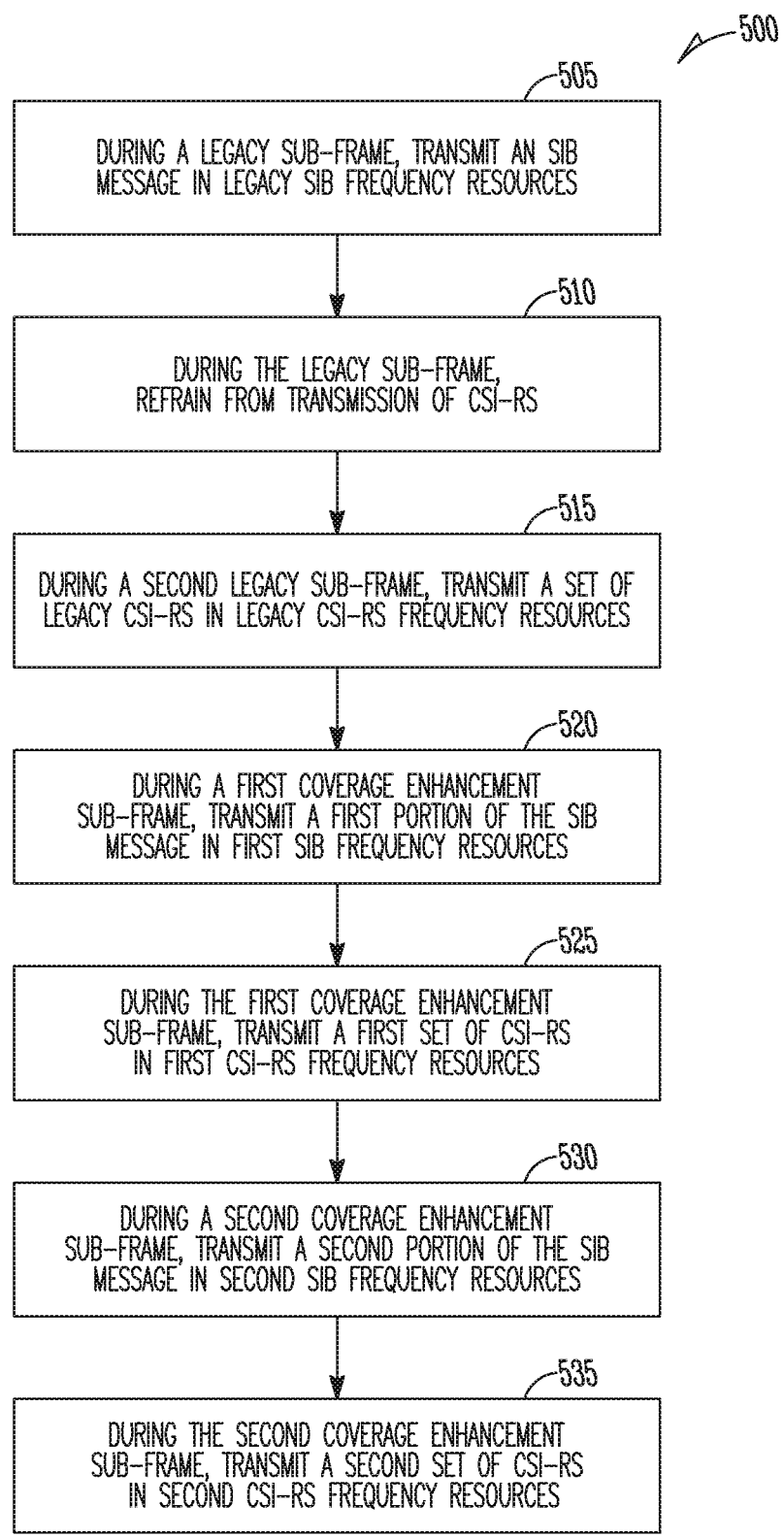
FIG. 5 illustrates the operation of a method for transmitting System Information Blocks (SIBs) and Channel State Information Reference Signals (CSI-RS) in accordance with some embodiments.

Referring to FIG. 5, a method 500 of communicating in accordance with a coverage enhancement mode is shown. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-10, although it is understood that the method 500 may be practiced with any other suitable systems, interfaces and components. For example, reference may be made to the scenario 400 in FIG. 4 described earlier for illustrative purposes, but the techniques and operations of the method 500 are not so limited.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, an SIB may be transmitted by the eNB 104 in legacy SIB frequency resources during a legacy sub-frame. The eNB 104 may refrain from transmission of channel state information reference signals (CSI-RS) during the legacy sub-frame at operation 510. In some embodiments, the eNB 104 may restrict, schedule or configure transmission during legacy sub-frames such that CSI-RSs are not transmitted in sub-frames in which they would collide with SIBs transmitted in those sub-frames. At operation 515, during a second legacy sub-frame, a set of legacy CSI-RS may be transmitted in legacy CSI-RS frequency resources. In some embodiments, the eNB 104 may transmit the set of legacy CSI-RS in the second legacy sub-frame when a collision with SIBs would not occur. The legacy CSI-RS frequency resources may at least partly overlap the legacy SIB frequency resources, in some embodiments, but may be exclusive from the legacy SIB frequency resources in other embodiments.

It should be noted that the discussion of the method 500 and other discussions herein may refer to SIBs, which may be broadcast messages transmitted by the eNB 104 that are receivable by UEs operating in a cell. In some embodiments, the SIB may be a SystemInformationBlockType1 or a SystemInformationBlockType1 message of the 3GPP or other standards, which may also be referred to as "SIB-1" or as an "SIB-1" message. The operations and techniques described herein are not limited to SIB-1 messages, however, and may be applied to other types or embodiments of System Information Blocks of 3GPP or other standards. The operations and techniques described herein are also not limited to SIBs, and similar operations and techniques may also be applied to other messages transmitted by the eNB 104, including paging messages for individual UEs or groups of UEs or other control messages.

Figure 6:
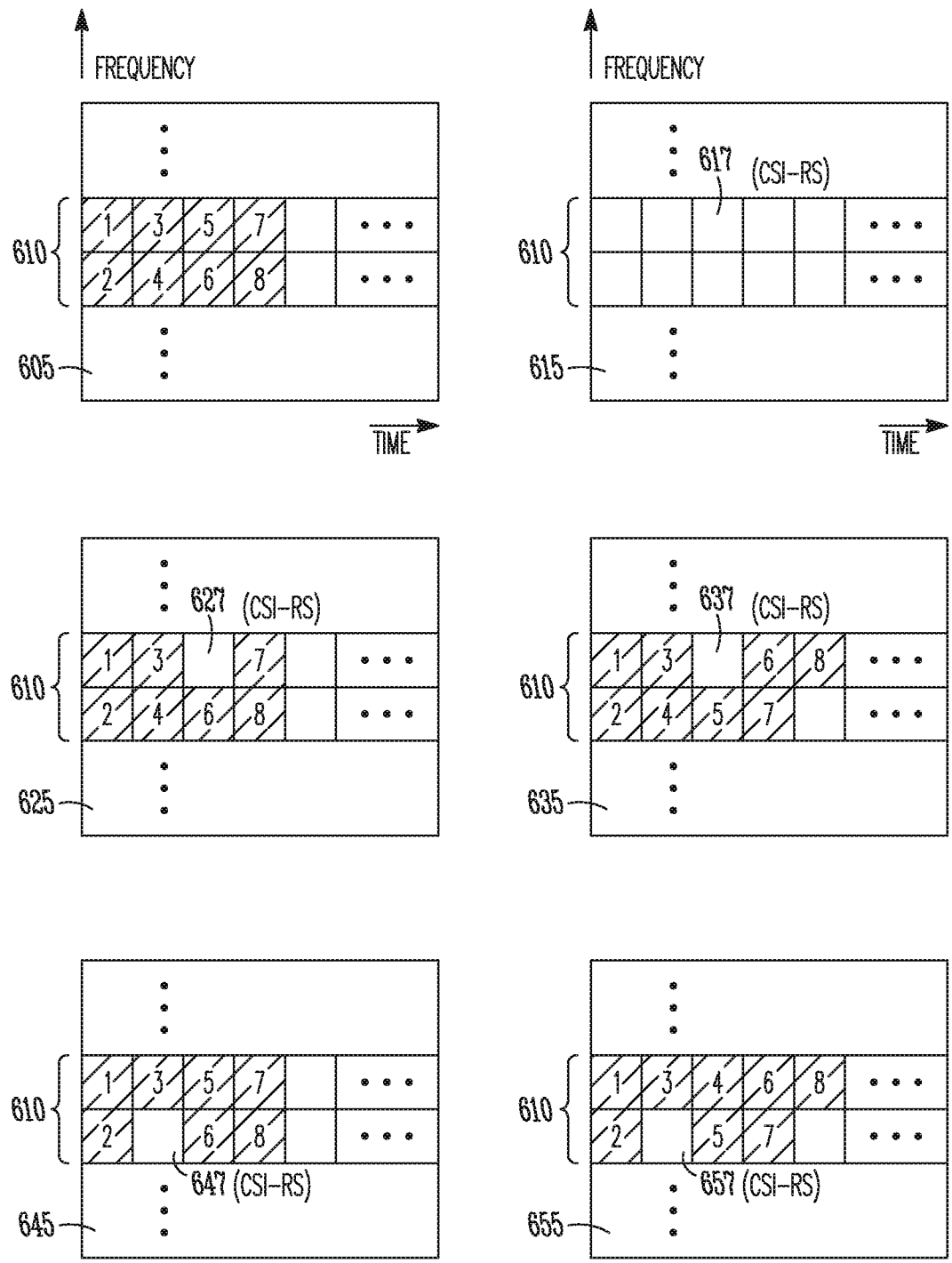
FIG. 6 illustrates examples of SIB and CSI-RS transmission in accordance with some embodiments.

Referring to FIG. 6, examples of transmission of SIBs and CSI-RSs are shown. For illustrative purposes, the time-frequency grid 605 (and others in FIG. 6) may span a sub-frame in time, and each block (grey or numbered or otherwise) may span an OFDM symbol period in time. In the frequency dimension, each block may span a frequency granularity corresponding to a Resource Block (RB). However, those time or frequency dimensions are not necessarily the sizes that would be used in an LTE protocol or by the system, and are only selected for ease of illustration in demonstrating the concepts.

In the grid 605, an SIB is transmitted as eight RBs numbered 1-8, allocated in a 2×4 block (row by column) as shown. In the examples of FIG. 6, the SIB is transmitted such that it spans the entire frequency range of the legacy SIB frequency resources 610, but this example is not limiting. In other embodiments, the SIB may be transmitted in just a portion of that frequency range or the frequency range may be larger than what is shown. The grid 605 may represent a legacy sub-frame in which an SIB is transmitted but the transmission of CSI-RS is refrained from or restricted. The grid 615 may represent a legacy sub-frame that does not include an SIB, but does include a CSI-RS 617. In this example, the CSI-RS 617 may be transmitted in the same frequency resources that were allocated in the grid 605 for block 5 of the SIB in that legacy sub-frame.

Returning to the method 500, at operation 520, during a first coverage enhancement sub-frame, a first portion of the SIB may be transmitted in first SIB frequency resources. A first set of CSI-RS may be transmitted in first CSI-RS frequency resources at operation 525. In some embodiments, the first SIB frequency resources may be included in or may at least partially overlap the legacy SIB frequency resources. In some embodiments, the first CSI-RS frequency resources may be included in or may at least partially overlap the legacy SIB frequency resources. In some embodiments, the first portion of the SIB may be the entire SIB.

In some cases, the entire SIB may be transmitted as a diversity copy in the first coverage enhancement sub-frame in the legacy SIB frequency resources. In some cases, one or more CSI-RS may also need to be transmitted in the first coverage enhancement sub-frame, and the first CSI-RS frequency resources for doing so may collide with some or all of the legacy SIB frequency resources. Accordingly, a diversity copy of the SIB, or a portion of the SIB, may be transmitted in first SIB frequency resources that may not be identical to those frequency resources used for transmission of the legacy SIB. As an example, the first SIB frequency resources may be determined according to a puncturing of the legacy SIB frequency resources by the first CSI-RS frequency resources. As another example, the first SIB frequency resources may be determined according to a rate-matching of the legacy SIB frequency resources by the first CSI-RS frequency resources.

These concepts are further illustrated in FIG. 6. The time-frequency grid 625 may include transmission of a portion of the SIB in part of the legacy frequency resources 610. The first CSI-RS may be transmitted in first CSI-RS frequency resources 627, which may result in block 5 of the SIB being replaced by (or punctured by) the first CSI-RS while the other blocks of the SIB (1-4 and 6-8) may be transmitted as shown. That is, the contents of the legacy frequency resources 610 in grid 605 may be described column-wise as {1, 2, 3, 4, 5, 6, 7, 8, . . . } while the contents of those resources in grid 625 may be described as {1, 2, 3, 4, CSI-RS, 6, 7, 8, . . . }. The blocks 1-4 and 6-8 together may be the first portion of the SIB in this example.

Accordingly, a puncturing of the legacy SIB frequency resources (used in the grid 605 for transmission of the SIB) by the first CSI-RS frequency resources 627 may result in the first SIB frequency resources used to transmit blocks 1-4 and 6-8 (grey boxes) in grid 625. In addition, puncturing may also be implemented by (or described as) puncturing the SIB with the first CSI-RS to produce a new version in which the first CSI-RS replaces part of the SIB, and the remaining untouched portion of the SIB is the first portion of the SIB.

The time-frequency grid 635 shows an example of transmission of the first CSI-RS along with the entire SIB. That is, the first portion of the SIB is the SIB in this example. The first SIB frequency resources are formed by rate-matching around the first CSI-RS frequency resources 637. Accordingly, none of the blocks 1-8 are dropped, but their placement within the legacy frequency resources 610 is changed. That is, the contents of the legacy frequency resources 610 in grid 605 may be described column-wise as {1, 2, 3, 4, 5, 6, 7, 8, . . . } while the contents of those resources in grid 635 may be described as {1, 2, 3, 4, CSI-RS, 5, 6, 7, 8, . . . }.

Accordingly, a rate-matching of the legacy SIB frequency resources (used in the grid 605 for transmission of the SIB) by the first CSI-RS frequency resources 637 may result in the first SIB frequency resources used to transmit blocks 1-8 (grey boxes) in grid 635. In addition, rate-matching may also be implemented by (or described as) inserting the first CSI-RS into the SIB at some location such that the portion of the SIB after that location is just delayed or pushed out without any of it being dropped.

It should be noted that in these examples, puncturing and rate-matching are performed with a granularity of one of the blocks (1-8). That is, a puncturing replaces an entire block and rate-matching inserts an entire block in these examples. This is not limiting, however, and is used only for ease of illustration. Puncturing and rate-matching may be done with any suitable granularity, including a single RE or any number of REs. For instance, a single modulated symbol, or any number of modulated symbols, may be punctured or rate-matched around in these techniques.

Returning to the method 500, at operation 530, during a second coverage enhancement sub-frame, a second portion of the SIB may be transmitted in second SIB frequency resources. A second set of CSI-RS may be transmitted in second CSI-RS frequency resources at operation 525. In some embodiments, the second CSI-RS frequency resources may include at least a portion of the legacy SIB frequency resources or may at least partially overlap the legacy SIB frequency resources. In some embodiments, the second CSI-RS frequency resources may be different than the first CSI-RS frequency resources. In some embodiments, the second portion of the SIB may be the entire SIB.

Previous discussion related to operations 520 and 525 may apply to operations 530 and 535, including techniques of puncturing and rate-matching. In addition, when the second CSI-RS frequency resources are different than the first CSI-RS frequency resources, the second SIB frequency resources may be different from the first SIB frequency resources.

As an example, the time-frequency grid 645 represents transmission of the second SIB portion in second SIB frequency resources different from the first SIB frequency resources shown in the grid 625. The difference results from the second CSI-RS being transmitted in frequency resources 647 which overlap a different portion of the legacy SIB frequency resources than did the first CSI-RS 627. That is, puncturing is applied to a different part of the legacy SIB frequency resources 610. As another example, the time-frequency grid 655 represents transmission of the second SIB portion (the entire SIB) in second SIB frequency resources different from the first SIB frequency resources shown in the grid 635. Similarly, the second CSI-RS being transmitted in frequency resources 657 which overlap a different portion of the legacy SIB frequency resources than did the first CSI-RS 637 causes a different result after rate-matching.

It should be pointed out that the method 500 may include any or all of the operations shown in FIG. 5. Similarly, the method 500 may include transmission of any or all of the example time-frequency grids shown in FIG. 6 (605, 615, 625, 635, 645, and 655) or others. The order of transmission and the number and frequency of transmissions of each time-frequency grid may vary in different communication sessions. As an example, the first or second CSI-RS may each be transmitted at a frequency of once every 5, 10 or 80 msec, or at any suitably selected frequency. As another example, the eNB 104 may periodically transmit a group of sub-frames that includes a group of legacy sub-frames in a contiguous block followed by a group of LTE coverage enhancement sub-frames in another contiguous block.

Accordingly, in some embodiments, the eNB 104 may transmit legacy sub-frames in accordance with legacy rules, operations, guidelines and standards in order to support existing legacy UEs 102 that may be incapable of recognizing or operating according to the coverage enhancement mode. Transmission of the legacy sub-frames may also accommodate UEs 102 that support, but are not currently in, the coverage enhancement mode. In some embodiments, the eNB 104 may also transmit coverage enhancement sub-frames to support newer UEs 102 that are capable of recognizing and operating in coverage enhancement mode. Any suitable combination of legacy and coverage enhancement sub-frames may be transmitted by the eNB 104 in order to accommodate needs of the system or types of UEs operating in the system. For instance, performance results, simulations or link budgets may indicate that a certain number of diversity repetitions of the SIB should be transmitted, which may determine the number of coverage enhancement sub-frames to be used.

Figure 7:
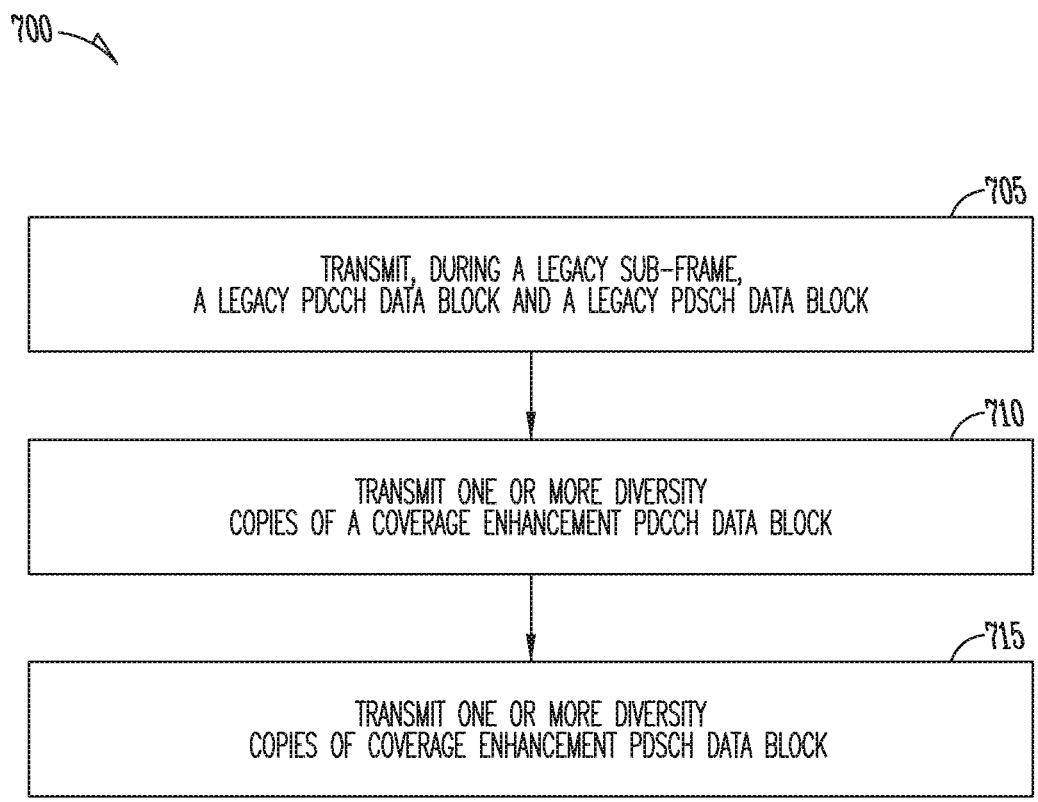
FIG. 7 illustrates the operation of a method for transmitting Physical Downlink Control Channel (PDCCH) and Physical Downlink Shared Channel (PDSCH) data blocks in accordance with some embodiments.

Referring to FIG. 7, a method 700 of operating in a coverage enhancement mode is shown. As mentioned previously regarding the method 500, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6 and 8-10, although it is understood that the method 700 may be practiced with any other suitable systems, interfaces and components. For example, reference may be made to the scenario 400 in FIG. 4 described earlier for illustrative purposes, but the techniques and operations of the method 700 are not so limited. In addition, embodiments of the method 700 may refer to eNBs 104, UEs 102, APs, STAs or other wireless or mobile devices.

At operation 705, a legacy PDCCH data block and a legacy PDSCH data block may be transmitted during a legacy sub-frame. The legacy PDCCH may include information about data allocations within the legacy PDSCH. As an example, the legacy PDCCH may describe a data allocation for a UE in terms of location or duration in time and frequency, modulation/coding scheme, hybrid ARQ configurations or other suitable parameters. In some embodiments, the legacy PDCCH data block and the legacy PDSCH data block may be transmitted as part of one or more OFDM signals comprising REs, and the information about data allocations within the legacy PDSCH may include information about RE locations and OFDM symbol indices of the data allocations. In some embodiments, the legacy PDCCH data block may be transmitted during a first contiguous group of OFDM symbol periods, the legacy PDSCH data block may be transmitted during a second contiguous group of OFDM symbol periods, and the earliest OFDM symbol period of the second group may immediately follow the latest OFDM symbol period of the first group. That is, the starting OFDM symbol for the PDSCH data block may be the OFDM symbol right after the end of the PDCCH data block.

Figure 8:
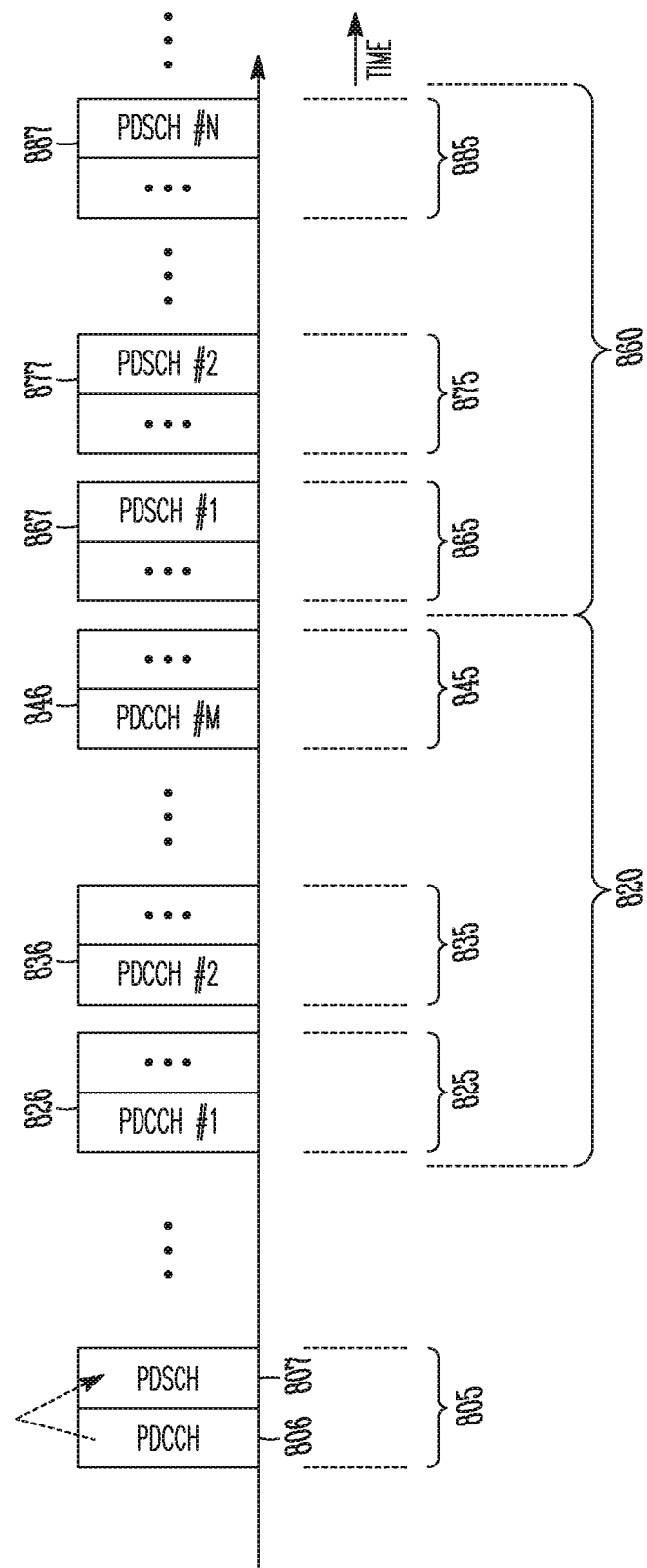
FIG. 8 shows examples of transmission of PDCCH and PDSCH data blocks in accordance with some embodiments.

Referring to FIG. 8, an example shows transmission of a legacy sub-frame 805 that includes a legacy PDCCH data block 806 and a legacy PDSCH data block 807. As indicated by the dotted arrow, the legacy PDCCH data block 806 may include information about the contents of the legacy PDSCH data block 807, which may enable a UE to decode whichever portions of the legacy PDSCH data block 807 are intended for it.

At operation 710, one or more diversity copies of a coverage enhancement PDCCH data block may be transmitted, and at operation 715, one or more diversity copies of a coverage enhancement PDSCH data block may be transmitted.

In some embodiments, during each of a first group of coverage enhancement sub-frames, a diversity copy of the coverage enhancement PDCCH data block may be transmitted. In addition, a diversity copy of the coverage enhancement PDSCH data block may be transmitted during each of a second, different group of coverage enhancement sub-frames. In some embodiments, the first and second groups of the coverage enhancement sub-frames may be contiguous groups and the earliest sub-frame of the second group may immediately follow the latest sub-frame of the first group. The coverage enhancement PDCCH data block and the coverage enhancement PDSCH data block may be transmitted as part of one or more OFDM signals comprising REs, and the information about data allocations within the coverage enhancement PDSCH may include information about RE locations and OFDM symbol indices of the data allocations.

The PDCCH (or PDSCH) data block may represent a set of information or control bits to be communicated, and may include a set of modulated symbols to be mapped to appropriate RE locations (in time, frequency or both) for transmission. The modulated symbols may be the same in some or all of the diversity copies, but this is not limiting, and the same set of information bits may produce different diversity copies. Such differences may depend on a time period (sub-frame, OFDM symbol or the like) in which a diversity copy is sent. The differences may also depend on an identifier of the diversity copy, such as an index on 1, 2, . . . M, for transmission of M diversity copies. Differences may also result from time variations in transmit frame structure. As an example, pilot locations or values inserted into a time-frequency grid may be different in two different sub-frames. Differences may also result from transmit/encoding functions such as error-correction coding or scrambling, which may be time-dependent in some embodiments. As an example, diversity copies for transmission in two different sub-frames may be different if scrambling functions used in those sub-frames are different. These examples are not limiting, however, as the differences may result from reasons other than time variation or index described above.

In some embodiments, the coverage enhancement PDCCH data block may include a starting OFDM symbol index of the coverage enhancement PDSCH data block within each of the second set of sub-frames. In some embodiments, the starting OFDM symbol index may be communicated to the UE 102 in a separate control message, such as an SIB. The coverage enhancement PDCCH data block may also include information about data allocations for one or more UEs within the coverage enhancement PDSCH data block.

Referring again to the example in FIG. 8, a first group 820 of LTE coverage enhancement sub-frames includes sub-frames 825, 835, 845, which include diversity copies (M in this case) of a coverage enhancement PDCCH 826, 836, 846. In addition, a second group 860 of LTE coverage enhancement sub-frames includes sub-frames 865, 875, 885, which include diversity copies (N in this case) of a coverage enhancement PDSCH 867, 877, 887. The diversity copies of PDCCH 826, 836, 846 may include a starting OFDM symbol index for the diversity copies of PDSCH 867, 877, 887 within the sub-frames 865, 875, 885, although that starting index may also be communicated to the UE 102 as part of another control message. The diversity copies of PDCCH 826, 836, 846 may also include information about data allocations within the diversity copies of PDSCH 867, 877, 887 for UEs in the system.

The eNB 104 may transmit any number of legacy sub-frames and coverage enhancement sub-frames according to any number of factors. Such factors may include system requirements, performance simulations or link budgets, a number of legacy UEs operating in the system, a number of UEs operating in or not operating in the coverage enhancement mode in the system or any other suitable factor. In addition, the scheduling or ordering of the legacy or coverage enhancement sub-frames is not limited to that shown in FIG. 8 and may be performed in any suitable manner. As an example, the eNB 104 may transmit periodically a group of sub-frames that includes a contiguous first group of legacy sub-frames followed by a contiguous second group of coverage enhancement sub-frames. As another example, during a particular time period, the type of UEs presently operating in the system may result in the eNB 104 transmitting only legacy sub-frames or transmitting only coverage enhancement sub-frames. Such a scenario could change as UEs enter or exit the system, or as UEs enter or exit coverage enhancement mode.

Returning to operations 710 and 715, in some embodiments, the legacy physical downlink control channel (PDCCH) data block and the legacy physical downlink shared channel (PDSCH) data block may be transmitted during the legacy sub-frame on a first frequency band, and the legacy PDCCH may include information about data allocations within the legacy PDSCH. In addition, during a coverage enhancement sub-frame, the coverage enhancement PDCCH data block may be transmitted on the first frequency band and transmitted on a second, disjoint frequency band. This arrangement is not limiting, however, as the PDCCH data block may be transmitted on any number of additional frequency bands that may be disjoint from the first and second frequency bands. Furthermore, during the coverage enhancement sub-frame, the coverage enhancement PDSCH data block may be transmitted on any suitable number of other frequency bands, including but not limited to the second frequency band.

The coverage enhancement PDCCH data block may include information about data allocations for one or more UEs within the coverage enhancement PDSCH data block. The PDCCH and PDSCH data blocks transmitted on multiple frequency bands may be the same in terms of transmitted symbols or mapping to REs, but are not limited. As previously described, diversity copies of one or more of the data blocks may be different in terms of transmitted symbols although representing the same information bits.

In some embodiments, the first, second, and other frequency bands may employ carrier aggregation (CA), in which multiple frequency bands may be available to the eNB 104 and UE 102. Some or all of the frequency bands may be adjacent to each other, but this is not limiting. As an example, an increase in capacity or throughput of a system may be accomplished through acquisition of new frequency spectra by a cellular carrier. Devices in the system may have access to some or all of the new or existing spectra, and in some cases may be able to utilize multiple carriers simultaneously.

Figure 9:
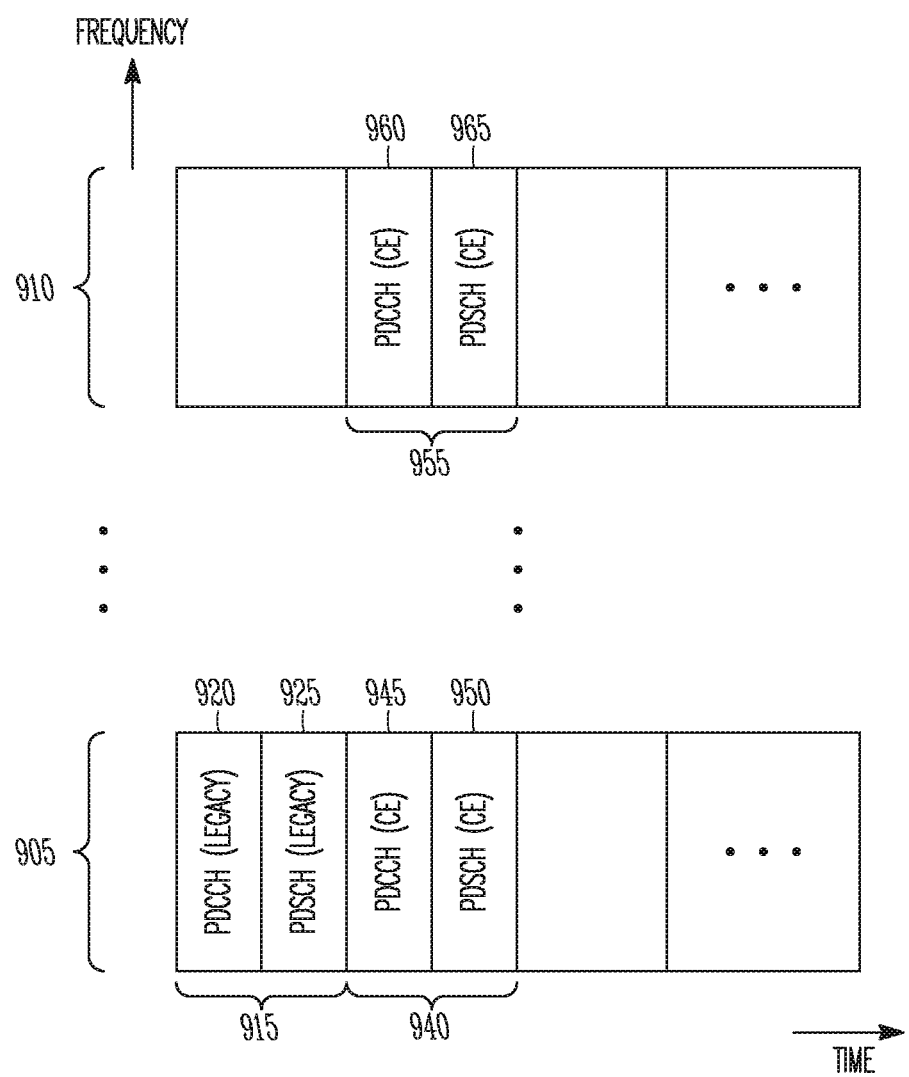
FIG. 9 shows examples of transmission of PDCCH and PDSCH data blocks in accordance with some embodiments.

Referring to FIG. 9, an example of transmission of various PDCCH and PDSCH data blocks is shown. In a legacy sub-frame 915, a legacy PDCCH data block 920 and a legacy PDSCH data block 925 are transmitted on a first frequency band 905. In a coverage enhancement sub-frame 940, 955, a coverage enhancement PDCCH data block 945 is transmitted on the first frequency band 905 and a diversity copy 960 is transmitted on a second frequency band 910. In addition, during the coverage enhancement sub-frame 940, 955, a coverage enhancement PDSCH data block 950 is transmitted on the first frequency band 905 and a diversity copy 965 is transmitted on the second frequency band 910. This example is not limiting in terms of the number, allocation or layout of frequency bands or sub-frames shown, as any suitable number, allocation or layout may be used.

Figure 10:
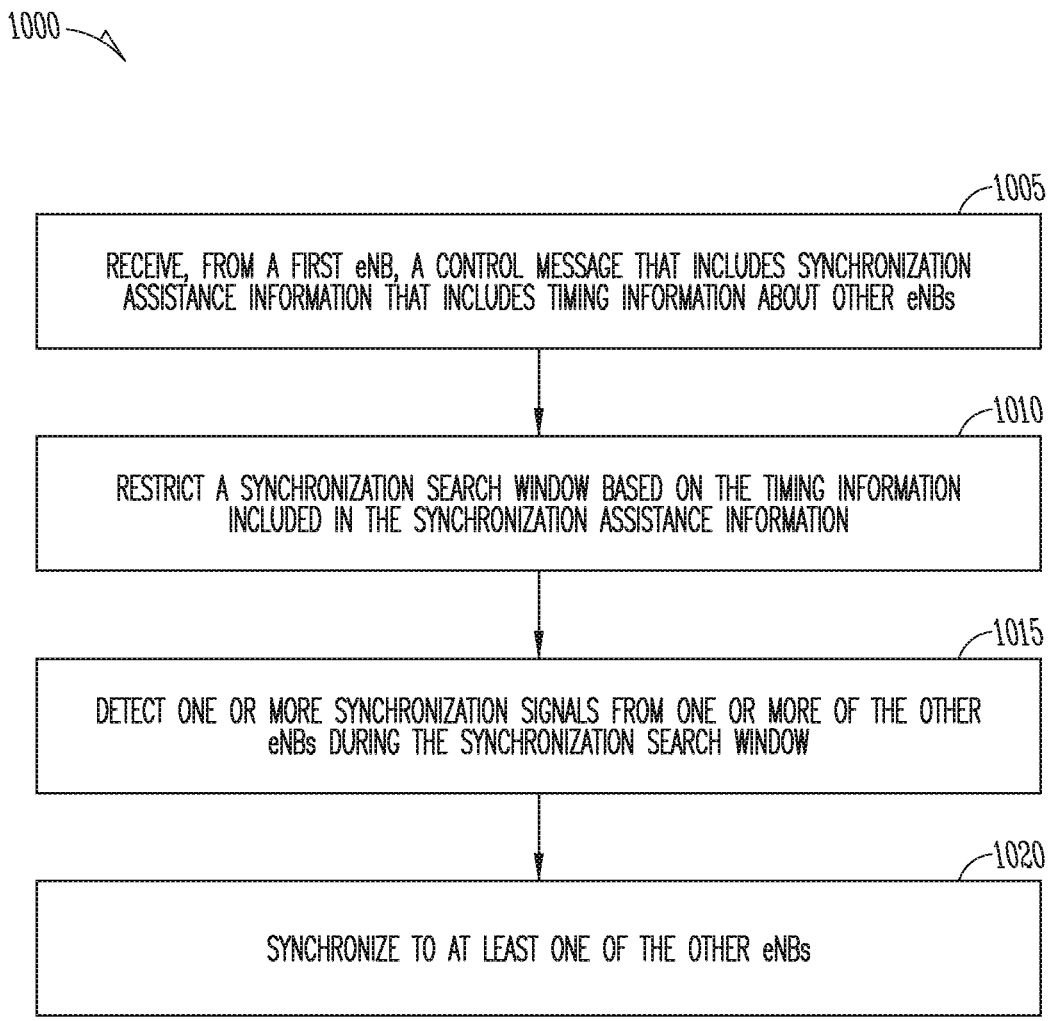
FIG. 10 illustrates the operation of a method for synchronization in accordance with some embodiments.

Referring to FIG. 10, a method 1000 of operating in a coverage enhancement mode is shown. As mentioned previously regarding the method 500, embodiments of the method 1000 may include additional or even fewer operations or processes in comparison to what is illustrated in FIG. 10 and embodiments of the method 1000 are not necessarily limited to the chronological order that is shown in FIG. 10. In describing the method 1000, reference may be made to FIGS. 1-9, although it is understood that the method 1000 may be practiced with any other suitable systems, interfaces and components. For example, reference may be made to the scenario 400 in FIG. 4 described earlier for illustrative purposes, but the techniques and operations of the method 1000 are not so limited. In addition, embodiments of the method 1000 may refer to eNBs 104, UEs 102, APs, STAs or other wireless or mobile devices.

At operation 1005, a control message may be received from a first eNB, and the control message may include synchronization assistance information that includes timing information about other eNBs. At operation 1010, a synchronization search window may be restricted based on the timing information included in the synchronization assistance information. At operation 1015, one or more synchronization signals from one or more of the other eNBs may be detected during the synchronization search window. At operation 1020, a UE may synchronize to at least one of the other eNBs. In some embodiments, the control and synchronization signals may be transmitted as part or all of one or more OFDM signals, which may include REs, as previously described. However, the techniques and operations are not limited to OFDM signals.

The UE 102 may benefit from hand-off to or monitoring of eNBs other than the eNB 104 to which the UE 102 may be engaged in a communication session. In addition, although reference may be made to hand-off or monitoring of neighboring eNBs while in communication with the eNB 104, techniques and operations described may also be applied to initial synchronization or re-synchronization, in which the UE 102 may or may not be engaged in a communication session with any eNBs.

The UE 102 may scan for and detect synchronization signals from other eNBs, which may be challenging or impossible in terms of processing time, power consumption or complexity. As an example, when the number of candidate eNBs or a number of cell identity groups is large, scanning for all or many of the possible hypotheses may be impossible or difficult. Furthermore, such scanning may be even more challenging for low-cost or low-complexity UEs, battery-operated UEs, UEs designed as or operating as MTC devices or UEs operating in a coverage enhancement mode. Accordingly, the UE 102 may improve the efficiency of those processes by using the synchronization assistance information previously described. As an example, a synchronization search window may be restricted in its time duration or time location, which may provide an improvement over scanning with a larger window or an open window. Determination of the window may be facilitated using the synchronization assistance information previously described.

The control message may include timing information about other eNBs. In addition, the control message may include any or all of physical layer cell ID information, duplexing schemes, and cyclic prefix (CP) types of the other eNBs. As an example, the duplexing schemes may include frequency division duplexing (FDD) or time division duplexing (TDD). As another example, the CP types may include short or long, or may be characterized by a length in time, a fraction of a symbol period or any other suitable parameter. As another example, physical layer cell ID information may include or characterize a cell specific reference signal (CRS). In some embodiments, the control message can be part or all of a system information block (SIB) or other message.

In some embodiments, the one or more synchronization signals may include primary synchronization signals (PSS) or secondary synchronization signals (SSS) transmitted from one or more neighboring eNBs or the eNB 104. The PSS may be detected for a neighboring eNB, and a relative time location of the SSS may be determined in response, and may depend on a duplexing scheme and CP type of the neighboring eNB.

Restriction of the synchronization search window may be based on the timing information included in the control message. As an example, the timing information may include system frame numbers (SFN) of one or more eNBs, relative differences between SFNs, alignment information about SFNs (such as whether or not SFNs between cells are aligned) or other suitable information. Such information may be used at the UE 102 to determine a time location for a window.

In addition, the time duration of the window may also be restricted or determined based on the timing information. As an example, the window may be restricted to a shorter length than would be used without knowledge of the timing information. In some embodiments, the window length may be a predefined value, such as +/−0.5 msec or +/−1.0 msec, but is not limited to those values.

In response to detection of the synchronization signals, the UE 102 may synchronize to one or more of the neighboring eNBs, which may include engaging in a communication session with those eNBs. The UE 102 may also continue to monitor some or all of those neighboring eNBs, and may use information from the detection, such as a refined timing location to search, in that process. The UE 102 may or may not remain synchronized to the eNB 104 (the current or original eNB) during or after the detection.

An eNB to operate in accordance with a coverage enhancement mode is disclosed herein. The eNB may comprise hardware processing circuitry to, during a legacy sub-frame, transmit a system information block (SIB) in legacy SIB frequency resources according to a legacy SIB transmission format and refrain from transmission of channel state information reference signals (CSI-RS). The hardware processing circuitry may be further to, during a first coverage enhancement sub-frame, transmit a first portion of the SIB in first SIB frequency resources included in the legacy SIB frequency resources. The hardware processing circuitry may be further to, during a first coverage enhancement sub-frame, transmit a first set of CSI-RS in first CSI-RS frequency resources that include at least a portion of the legacy SIB frequency resources. The hardware processing circuitry may be further to, during a second coverage enhancement sub-frame, transmit a second portion of the SIB in second SIB frequency resources included in the legacy SIB frequency resources and transmit a second set of CSI-RS in second CSI-RS frequency resources that include at least a portion of the legacy SIB frequency resources. In some embodiments, at least a portion of the first CSI-RS frequency resources may be excluded from the second CSI-RS frequency resources.

In some embodiments, the first SIB frequency resources may be determined according to a puncturing of the legacy SIB frequency resources by the first CSI-RS frequency resources. In some embodiments, the first SIB frequency resources may be determined according to a rate-matching of the legacy SIB frequency resources by the first CSI-RS frequency resources. In some embodiments, the first CSI-RS frequency resources may be determined according to a sub-frame index of the first coverage enhancement sub-frame. In some embodiments, the SIBs and CSI-RS may be transmitted as part of one or more orthogonal frequency division multiplexing (OFDM) signals and the frequency resources may be resource elements (REs) of the OFDM signals. In some embodiments, the legacy sub-frame may be a sub-frame that is designated for transmission of the SIB for reception by at least a legacy User Equipment (UE). In some embodiments, the first portion of the SIB may be a diversity repetition of the SIB that enables diversity reception of the SIB by a UE operating in the coverage enhancement mode.

The hardware processing circuitry may be further to, during a legacy sub-frame, transmit a paging message in legacy paging frequency resources according to a legacy paging transmission format and refrain from transmission of channel state information reference signals (CSI-RS). The hardware processing circuitry may be further to, during a first coverage enhancement sub-frame, transmit a first portion of the paging message in first paging frequency resources included in the legacy paging frequency resources. The hardware processing circuitry may be further to, during a first coverage enhancement sub-frame, transmit a first set of CSI-RS in first CSI-RS frequency resources that include at least a portion of the legacy paging frequency resources. The hardware processing circuitry may be further to, during a second coverage enhancement sub-frame, transmit a second portion of the paging message in second paging frequency resources included in the legacy paging frequency resources and transmit a second set of CSI-RS in second CSI-RS frequency resources that include at least a portion of the legacy paging frequency resources. In some embodiments, at least a portion of the first CSI-RS frequency resources may be excluded from the second CSI-RS frequency resources.

In some embodiments, the first paging frequency resources may be determined according to a puncturing of the legacy paging frequency resources by the first CSI-RS frequency resources. In some embodiments, the first paging frequency resources may be determined according to a rate-matching of the legacy paging frequency resources by the first CSI-RS frequency resources. In some embodiments, the first CSI-RS frequency resources may be determined according to a sub-frame index of the first coverage enhancement sub-frame. In some embodiments, the paging messages and CSI-RS may be transmitted as part of one or more orthogonal frequency division multiplexing (OFDM) signals and the frequency resources may be resource elements (REs) of the OFDM signals. In some embodiments, the legacy sub-frame may be a sub-frame that is designated for transmission of the paging message for reception by at least a legacy User Equipment (UE). In some embodiments, the first portion of the paging message may be a diversity repetition of the paging message that enables diversity reception of the paging message by a UE operating in the coverage enhancement mode.

A User Equipment (UE) to operate in accordance with handover between Evolved Node-Bs (eNBs) while in a coverage enhancement mode is disclosed herein. The UE may comprise hardware processing circuitry to receive, from a first eNB, a control message that includes synchronization assistance information that includes timing information about other eNBs. The hardware processing circuitry may be further to synchronize to at least one of the other eNBs. In some embodiments, the synchronization for each of the other eNBs may include detection of a synchronization signal from the eNB during a synchronization search window and restriction of the synchronization search window based on the timing information about the eNB included in the synchronization assistance information.

In some embodiments, the synchronization assistance information may further include physical layer cell ID information about the other eNBs and the detection of a synchronization signal from the eNB is further based on the physical layer cell ID of the eNB. In some embodiments, the synchronization assistance information may further include duplexing schemes of the other eNBs and the restriction of the synchronization search window may be further based on the duplexing scheme of the eNB. In some embodiments, the synchronization assistance information may further include cyclic prefix (CP) types of the other eNBs and the restriction of the synchronization search window may be further based on the duplexing scheme of the eNB. In some embodiments, the synchronization signal may include an LTE primary synchronization signal (PSS) or an LTE secondary synchronization signal (SSS). In some embodiments, the control messages and synchronization signal may be received as part of one or more orthogonal frequency division multiplexing (OFDM) signals comprising resource elements (REs).

A non-transitory computer-readable storage medium that stores instructions for execution by one or more processors to perform operations for communication in a coverage enhancement mode is disclosed herein. The operations may configure the one or more processors to, during a legacy sub-frame, transmit a system information block (SIB) in legacy SIB frequency resources according to a legacy SIB transmission format and refrain from transmission of channel state information reference signals (CSI-RS). The operations may further configure the one or more processors to, during a first coverage enhancement sub-frame, transmit a first portion of the SIB in first SIB frequency resources included in the legacy SIB frequency resources and transmit a first set of CSI-RS in first CSI-RS frequency resources that include at least a portion of the legacy SIB frequency resources.

The operations may further configure the one or more processors to, during a second coverage enhancement sub-frame, transmit a second portion of the SIB in second SIB frequency resources included in the legacy SIB frequency resources and transmit a second set of CSI-RS in second CSI-RS frequency resources that include at least a portion of the legacy SIB frequency resources. In some embodiments, at least a portion of the first CSI-RS frequency resources may be excluded from the second CSI-RS frequency resources. In some embodiments, the first SIB frequency resources may be determined according to a puncturing of the legacy SIB frequency resources by the first CSI-RS frequency resources or according to a rate-matching of the legacy SIB frequency resources by the first CSI-RS frequency resources.

A method of communicating in a coverage enhancement mode is disclosed herein. The method may include, during a legacy sub-frame, transmitting a system information block (SIB) in legacy SIB frequency resources according to a legacy SIB transmission format and refraining from transmission of channel state information reference signals (CSI-RS). The method may also include, during a first coverage enhancement sub-frame, transmitting a first portion of the SIB in first SIB frequency resources included in the legacy SIB frequency resources and transmitting a first set of CSI-RS in first CSI-RS frequency resources that include at least a portion of the legacy SIB frequency resources.

The method may further include, during a second coverage enhancement sub-frame, transmitting a second portion of the SIB in second SIB frequency resources included in the legacy SIB frequency resources and transmitting a second set of CSI-RS in second CSI-RS frequency resources that include at least a portion of the legacy SIB frequency resources. In some embodiments, at least a portion of the first CSI-RS frequency resources may be excluded from the second CSI-RS frequency resources. In some embodiments, the first SIB frequency resources may be determined according to a puncturing of the legacy SIB frequency resources by the first CSI-RS frequency resources or according to a rate-matching of the legacy SIB frequency resources by the first CSI-RS frequency resources.

An eNB to operate in accordance with a coverage enhancement mode is also disclosed herein. The eNB may comprise hardware processing circuitry to transmit a legacy physical downlink control channel (PDCCH) data block and a legacy physical downlink shared channel (PDSCH) data block. In some embodiments, the legacy PDCCH data block may include information about data allocations within the legacy PDSCH data block, and the data allocations within the legacy PDSCH data block may be for one or more legacy UEs. The hardware processing circuitry may be further to transmit one or more diversity copies of a coverage enhancement PDCCH data block and one or more diversity copies of a coverage enhancement PDSCH data block. In some embodiments, the coverage enhancement PDCCH data block may include a starting OFDM symbol index for the coverage enhancement PDSCH data block and information about data allocations within the coverage enhancement PDSCH data block, and the data allocations within the coverage enhancement PDSCH data block may be for one or more coverage enhancement UEs.

In some embodiments, the diversity copies of the PDCCH data block may be transmitted in each of a first group of coverage enhancement sub-frames and the diversity copies of the PDSCH data block may be transmitted in each of a second, different group of coverage enhancement sub-frames. In some embodiments, the first and second groups of coverage enhancement sub-frames may be contiguous groups and the earliest sub-frame of the second group may immediately follow the latest sub-frame of the first group. In some embodiments, the legacy PDCCH data block may be transmitted during a first contiguous group of OFDM symbol periods and the legacy PDSCH data block may be transmitted during a second contiguous group of OFDM symbol periods. In some embodiments, the earliest OFDM symbol period of the second group may immediately follow the latest OFDM symbol period of the first group.

In some embodiments, the legacy PDCCH data block and the legacy PDSCH data block may be transmitted during a legacy sub-frame on a first frequency spectra. In some embodiments, the diversity copies of the PDCCH data block may be transmitted during a coverage enhancement sub-frame on each of multiple, disjoint frequency spectra that includes the first frequency spectra. In some embodiments, the diversity copies of the PDSCH data block may be transmitted during a coverage enhancement sub-frame on each of multiple, disjoint frequency spectra that includes the first frequency spectra.

In some embodiments, the multiple, disjoint frequency spectra may operate according to a carrier aggregation (CA) and transmission of the legacy PDCCH and PDSCH data blocks may be restricted to the first frequency spectra. In some embodiments, transmission of the coverage enhancement PDCCH and PDSCH data blocks may occur on the first frequency spectra and at least one other frequency spectra of the multiple, disjoint frequency spectra.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of an Evolved Node-B (eNB), the apparatus comprising: processing circuitry, configured to: determine a plurality of mapped resource elements of a physical downlink shared channel (PDSCH), for transmission of a system information block (SIB) to a user equipment (UE) configured for enhanced coverage, the mapped resource elements to repeat periodically in sets of frames, wherein one or more channel state information reference signals (CSI-RS) occupies one or more of the mapped resource elements; and configure the eNB to transmit, during an enhanced coverage sub-frame, the SIB within the plurality of mapped resource elements of the PDSCH; and memory, configured to store data of the SIB.

In Example 2, the subject matter of Example 1 includes, wherein the processing circuitry is configured to configure the eNB to refrain from transmission of the CSI-RS within resource elements of the enhanced coverage sub-frame.

In Example 3, the subject matter of Example 2 includes, wherein the processing circuitry is configured to configure the eNB to refrain from transmission of a CSI-RS in a subframe where transmission of the CSI-RS would collide with the SIB.

In Example 4, the subject matter of Examples 1-3 includes, wherein the processing circuitry is configured to configure the eNB to refrain from transmission of a CSI-RS in a subframe configured for transmission of paging messages.

In Example 5, the subject matter of Examples 2-4 includes, wherein the processing circuitry is configured to determine one or more resource elements of the plurality of mapped resource elements for transmission of the SIB according to a puncturing of the plurality of mapped resource elements by the CSI-RS.

In Example 6, the subject matter of Examples 1-5 includes, wherein the processing circuitry is further configured to configure the eNB to: transmit, during the enhanced coverage sub-frame, a first portion of the SIB within the plurality of mapped resource elements of the PDSCH; and transmit, during the enhanced coverage sub-frame, a first set of CSI-RS within a portion of the plurality of mapped resource elements of the PDSCH.

In Example 7, the subject matter of Example 6 includes, wherein the processing circuitry is further configured to configure the eNB to: transmit, during the enhanced coverage sub-frame, a second portion of the SIB to the UE within a second plurality of mapped resource elements of the PDSCH; and transmit, during the enhanced coverage sub-frame, a second set of CSI-RS within a portion of the second plurality of mapped resource elements of the PDSCH, wherein the portion of the plurality of mapped resource elements for transmission of the first set of CSI-RS is excluded from the portion of the second plurality of mapped resource elements.

In Example 8, the subject matter of Examples 1-7 includes, wherein the processing circuitry is further configured to configure the eNB to: transmit, during a legacy sub-frame, a SIB in a third plurality of mapped resource elements of the PDSCH; and refrain from transmission of a CSI-RS.

Example 9 is a computer-readable hardware storage device that stores instructions for execution by one or more processors of a station (STA), the instructions to configure the one or more processors to: determine a plurality of mapped resource elements of a physical downlink shared channel (PDSCH), for transmission of a system information block (SIB) to a user equipment (UE) configured for enhanced coverage, the mapped resource elements to repeat periodically in sets of frames, wherein one or more channel state information reference signals (CSI-RS) occupies one or more of the mapped resource elements; and configure the eNB to transmit, during an enhanced coverage sub-frame, the SIB within the plurality of mapped resource elements of the PDSCH.

In Example 10, the subject matter of Example 9 includes, wherein the instructions are further to configure the one or more processors to configure the eNB to refrain from transmission of the CSI-RS within resource elements of the enhanced coverage sub-frame.

In Example 11, the subject matter of Example 10 includes, wherein the instructions are further to configure the one or more processors to configure the eNB to refrain from transmission of a CSI-RS in a subframe where transmission of the CSI-RS would collide with the SIB.

In Example 12, the subject matter of Examples 9-11 includes, wherein the instructions are further to configure the one or more processors to configure the eNB to refrain from transmission of a CSI-RS in a subframe configured for transmission of paging messages.

In Example 13, the subject matter of Examples 10-12 includes, wherein the instructions are further to configure the one or more processors to determine one or more resource elements of the plurality of mapped resource elements for transmission of the SIB according to a puncturing of the plurality of mapped resource elements by the CSI-RS.

In Example 14, the subject matter of Examples 9-13 includes, wherein the instructions are further to configure the one or more processors to configure the eNB to: transmit, during the enhanced coverage sub-frame, a first portion of the SIB within the plurality of mapped resource elements of the PDSCH; and transmit, during the enhanced coverage sub-frame, a first set of CSI-RS within a portion of the plurality of mapped resource elements of the PDSCH.

In Example 15, the subject matter of Example 14 includes, wherein the instructions are further to configure the one or more processors to configure the eNB to: transmit, during the enhanced coverage sub-frame, a second portion of the SIB to the UE within a second plurality of mapped resource elements of the PDSCH; and transmit, during the enhanced coverage sub-frame, a second set of CSI-RS in within a portion of the second plurality of mapped resource elements of the PDSCH, wherein the portion of the plurality of mapped resource elements for transmission of the first set of CSI-RS is excluded from the portion of the second plurality of mapped resource elements.

In Example 16, the subject matter of Examples 9-15 includes, wherein the instructions are further to configure the one or more processors to configure the eNB to: transmit, during a legacy sub-frame, a SIB in a third plurality of mapped resource elements of the PDSCH; and refrain from transmission of a CSI-RS.

Example 17 is a system comprising: a user equipment (UE) configured to operate in an enhanced coverage mode; and an Evolved Node-B (eNB), the eNB configured to: determine a plurality of mapped resource elements of a physical downlink shared channel (PDSCH), for transmission of a system information block (SIB) to the UE, the mapped resource elements to repeat periodically in sets of frames, wherein one or more channel state information reference signals (CSI-RS) occupies one or more of the mapped resource elements; and configure the eNB to transmit, during an enhanced coverage sub-frame, the SIB within the plurality of mapped resource elements of the PDSCH.

In Example 18, the subject matter of Example 17 includes, wherein the eNB is configured to refrain from transmission of the CSI-RS within resource elements of the enhanced coverage sub-frame.

In Example 19, the subject matter of Example 18 includes, wherein the eNB is configured to refrain from transmission of a CSI-RS in a subframe where transmission of the CSI-RS would collide with the SIB.

In Example 20, the subject matter of Examples 17-19 includes, wherein the eNB is configured to refrain from transmission of a CSI-RS in a subframe configured for transmission of paging messages.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. An apparatus of an Evolved Node-B (eNB), the apparatus comprising: processing circuitry; and memory, the processing circuitry configured to:
encode an information block for transmission to a user equipment (UE) to indicate a mapping of resource elements for a physical downlink shared channel (PDSCH);
map the PDSCH to all the resource elements indicated in the mapping for transmission of the PDSCH; and
configure the eNB for transmission of the PDSCH in the resource elements based on the mapping,
wherein if the UE is configured for enhanced coverage, the processing circuitry is configured to exclude the resource elements indicated by the mapping that are occupied by a channel state information reference signal (CSI-RS) when transmitting the PDSCH, and
wherein the memory is configured to store the information block.

2. The apparatus of claim 1, wherein one or more CSI-RSs occupies one or more or the resource elements indicated in the mapping for the PDSCH.

3. The apparatus of claim 1 wherein the information block is a system information block (SIB).

4. The apparatus of claim 1 wherein the information block is a master information block (MIB).

5. The apparatus of claim 1 wherein the processing circuitry is configured to encode the PDSCH for transmission based on all the resource elements indicated by the mapping and refrain from transmitting the PDSCH in the resource elements occupied by a CSI-RS.

6. The apparatus of claim 1 wherein the processing circuitry is configured to count the resource elements occupied by the CS-RSs in the PDSCH mapping but not use the resource elements occupied by the CS-RSs for transmission of the PDSCH.

7. The apparatus of claim 1 wherein the processing circuitry is configured to:
determine the mapped resource elements to repeat periodically in sets of frames; and
if the UE is configured for enhanced coverage:
encode the information block for transmission during an enhanced coverage sub-frame;
refrain from transmission of the CSI-RS within resource elements of the enhanced coverage sub-frame; and
refrain from transmission of a CSI-RS in a subframe where transmission of the CSI-RS would collide with the information block.

8. The apparatus of claim 7, wherein the processing circuitry is further configured to configure the eNB to:
transmit, during the enhanced coverage sub-frame, a first portion of the SIB within the plurality of mapped resource elements of the PDSCH; and
transmit, during the enhanced coverage sub-frame, a first set of CSI-RS within a portion of the plurality of mapped resource elements of the PDSCH.

9. The apparatus of claim 8, wherein the processing circuitry is further configured to configure the eNB to:
transmit, during the enhanced coverage sub-frame, a second portion of the SIB to the UE within a second plurality of mapped resource elements of the PDSCH; and
transmit, during the enhanced coverage sub-frame, a second set of CSI-RS in within a portion of the second plurality of mapped resource elements of the PDSCH, wherein the portion of the plurality of mapped resource elements for transmission of the first set of CSI-RS is excluded from the portion of the second plurality of mapped resource elements.

10. The apparatus of claim 1 wherein the processing circuitry comprises a baseband processor.

11. A non-transitory computer-readable storage medium that stores instructions for execution by processing circuitry of an Evolved Node-B (eNB), the instructions to configure the processing circuitry to:
- encode an information block for transmission to a user equipment (UE) to indicate a mapping of resource elements for a physical downlink shared channel (PDSCH);
- map the PDSCH to all the resource elements indicated in the mapping for transmission of the PDSCH;
- configure the eNB for transmission of the PDSCH in the resource elements based on the mapping; and
- store the information block in memory,
- wherein if the UE is configured for enhanced coverage, the processing circuitry is configured to exclude the resource elements indicated by the mapping that are occupied by a channel state information reference signal (CSI-RS) when transmitting the PDSCH.

12. The non-transitory computer-readable storage medium of claim 11, wherein one or more CSI-RSs occupies one or more or the resource elements indicated in the mapping for the PDSCH.

13. The non-transitory computer-readable storage medium of claim 11 wherein the information block is a system information block (SIB).

14. The non-transitory computer-readable storage medium of claim 11 wherein the information block is a master information block (MIB).

15. The non-transitory computer-readable storage medium of claim 11 wherein the processing circuitry is configured to encode the PDSCH for transmission based on all the resource elements indicated by the mapping and refrain from transmitting the PDSCH in the resource elements occupied by a CSI-RS.

16. The non-transitory computer-readable storage medium of claim 11 wherein the processing circuitry is configured to count the resource elements occupied by the CS-RSs in the PDSCH mapping but not use the resource elements occupied by the CS-RSs for transmission of the PDSCH.

17. The non-transitory computer-readable storage medium of claim 11 wherein the processing circuitry is configured to:
- determine the mapped resource elements to repeat periodically in sets of frames; and
- if the UE is configured for enhanced coverage:
  - encode the information block for transmission during an enhanced coverage sub-frame;
- refrain from transmission of the CSI-RS within resource elements of the enhanced coverage sub-frame; and
  - refrain from transmission of a CSI-RS in a subframe where transmission of the CSI-RS would collide with the information block.

18. The non-transitory computer-readable storage medium of claim 17, wherein the processing circuitry is further configured to configure the eNB to:
- transmit, during the enhanced coverage sub-frame, a first portion of the SIB within the plurality of mapped resource elements of the PDSCH; and
- transmit, during the enhanced coverage sub-frame, a first set of CSI-RS within a portion of the plurality of mapped resource elements of the PDSCH.

19. The non-transitory computer-readable storage medium of claim 18, wherein the processing circuitry is further configured to configure the eNB to:
- transmit, during the enhanced coverage sub-frame, a second portion of the SIB to the UE within a second plurality of mapped resource elements of the PDSCH; and
- transmit, during the enhanced coverage sub-frame, a second set of CSI-RS in within a portion of the second plurality of mapped resource elements of the PDSCH, wherein the portion of the plurality of mapped resource elements for transmission of the first set of CSI-RS is excluded from the portion of the second plurality of mapped resource elements.

20. An apparatus of User Equipment (UE) configured for enhanced coverage, the apparatus comprising: processing circuitry; and memory, the processing circuitry configured to:
- decode an information block received from an Evolved Node-B (eNB), the information block to indicate a mapping of resource elements for a physical downlink shared channel (PDSCH);
- decode one or more channel state information reference signals (CSI-RSs) received on some of the resource elements indicated in the mapping for transmission of the PDSCH;
- decode the PDSCH received on the resource elements indicated in the mapping for transmission of the PDSCH that were not occupied by a CSI-RS; and
- store the information block in the memory.

* * * * *